May 13, 1958    J. E. GILCHRIST    2,834,595
FOLDER CONTROL
Filed Dec. 7, 1954    2 Sheets-Sheet 2
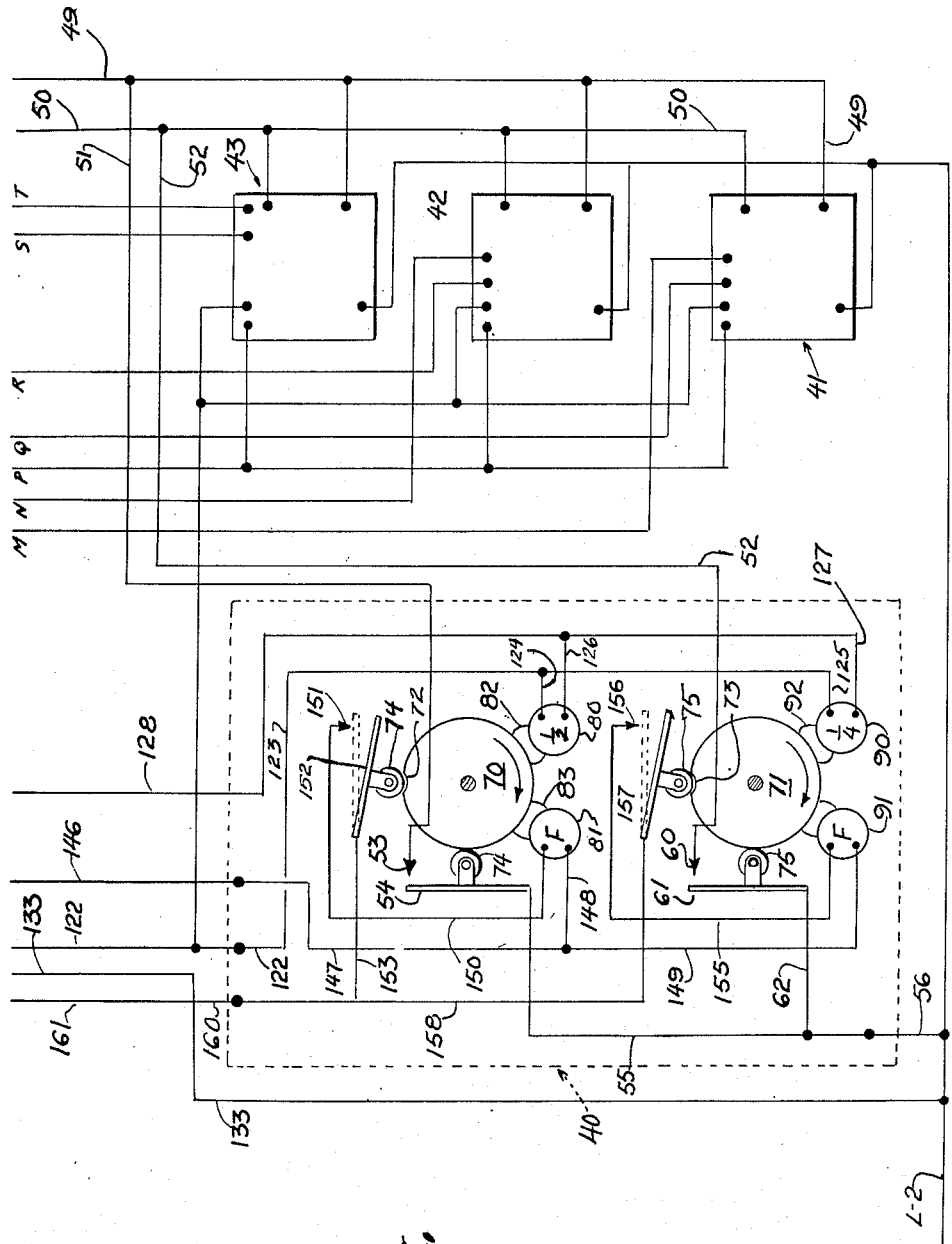
Fig. II.
INVENTOR
JOHN E. GILCHRIST
BY
Pollard Johnston Smythe & Robertson
ATTORNEYS

United States Patent Office 2,834,595
Patented May 13, 1958

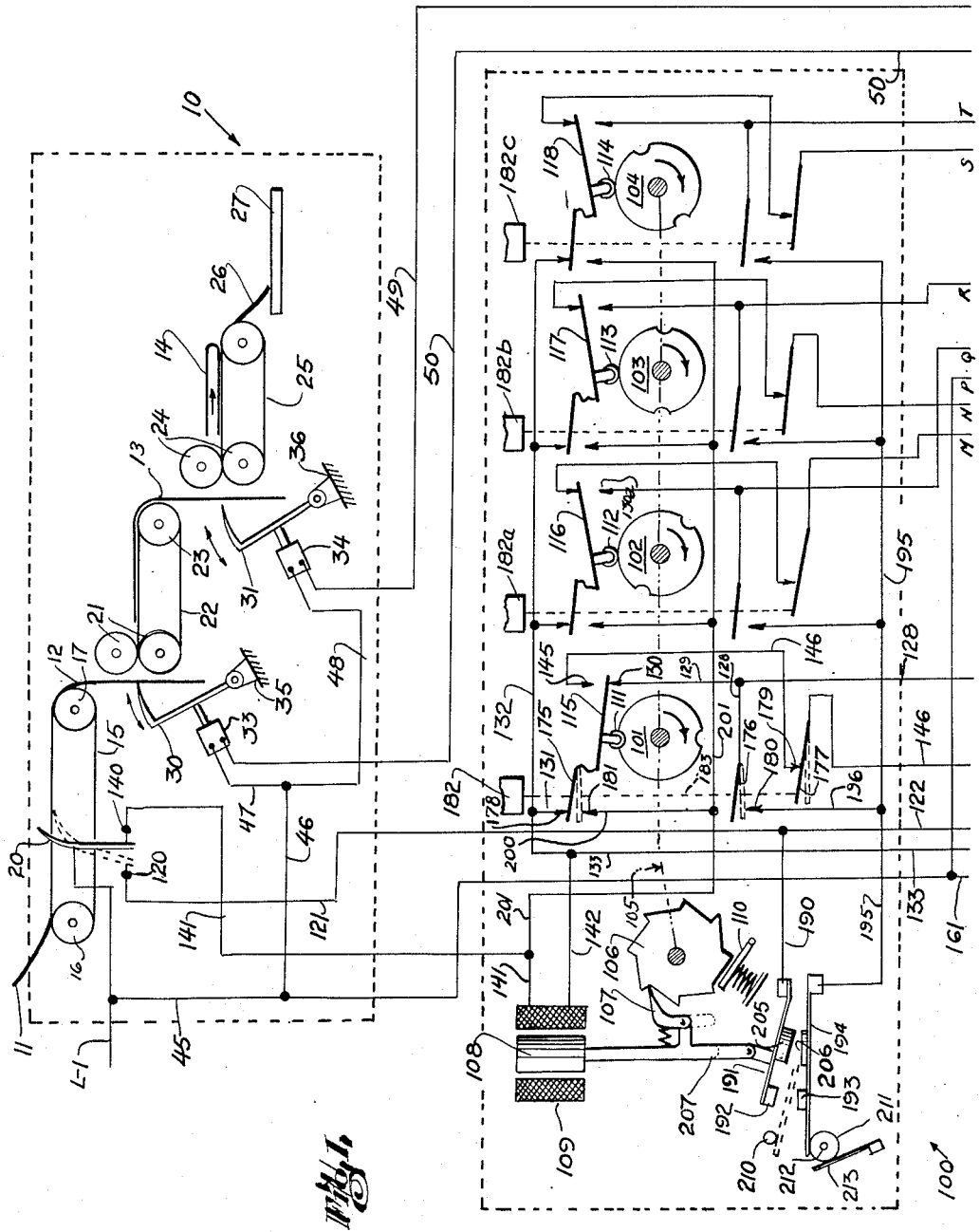

2,834,595

FOLDER CONTROL

John E. Gilchrist, Seattle, Wash., assignor to American Machine and Metals, Inc., New York, N. Y., a corporation of Delaware Application December 7, 1954, Serial No. 473,522

5 Claims. (Cl. 270—81)

This invention relates to an apparatus for controlling article folding machines such as used for folding bed sheets or the like and particularly to an arrangement having a selective mechanism associated with measuring units for by-passing units that may become defective.

In present folding control devices, no provision is made for operating only the useful parts of the system in the event that one part becomes inoperative due to mechanical failure, electrical failure or for other cause. For example, in devices having a plurality of measuring units, said units being used in a measuring and folding machine for folding sheets of unknown length into predetermined fractional folds, failure of one of said units will cause impairment in operation of the machine as a whole. In such a device, the articles normally are fed in close succession.

The control is illustrated in connection with that type of controller shown and described in the patent applications, Serial No. 344,762, filed March 26, 1953, now Patent No. 2,777,689, and Serial No. 312,834, filed October 2, 1952, now Patent No. 2,774,592.

An object of this invention is to provide a more versatile controlling device which will permit operation of operative portions of the mechanism while permitting by-passing of inoperative portions thereof.

A further object of the invention is to provide a sequence modifying means in combination with a folder control which means can disable certain portions of the folder control to render only certain selected parts thereof operable.

The present invention provides convenient sequence modifying means for causing short-cycling of the selector or folder control unit whereby a given measuring unit or timing mechanism, if defective, can be by-passed in its function and the next succeeding unit in a predetermined sequence be caused to take over the function and function properly. In other words in the four unit devices shown and to be described below, the normal procedure is that the first unit measures the first item, the second unit measures the second item, the third unit measures the third item, the fourth unit measures the fourth item, the first unit measures the fifth item, the second unit measures the sixth item, etc. However, with the invention herein, if one unit is defective (the fourth one in this example) it can be immediately switched out and by-passed so that the following sequence obtains: The first unit will measure the first item, the second unit will measure the second item, the third unit will measure the third item, the fourth unit will be cut out, so the first unit will measure the fourth item, the second unit will measure the fifth item, etc.

Other objects, advantages and features of the invention will become apparent from the following description and drawings, which are merely exemplary.

In the drawings:

Figure I is a diagrammatic view of a folding machine and control system therefor, and, Figure II is a diagrammatic view of four folding controllers and wherein the wires thereof connect with the wires of Figure I to render the entire structure unitary.

Referring more in detail to the drawing, a folding apparatus is generally indicated at 10. This machine in conventional folding machine practice comprises a series of conveyor belts or tapes operating upon rollers in series. In the several stages through the folding machine flat sheets or the like are forced between rollers by folding blades to effect one or more folds in the sheets. In the diagrammatic illustration, here shown, the sheets are folded into halves and quarters.

The folding apparatus 10 is adapted to receive a series of sheets 11, 12, 13 and 14, and as many more as are fed through a conventional ironer, for example. It is not essential that this folding machine be attached to an ironer but may be remote therefrom, but it may receive ironed objects directly from an ironer for folding, if desired. The sheet 11 passes down upon parallel tapes 15 carried upon driven rolls 16 and 17. A measuring finger 20, which constitutes a sensing means, extends upwardly between the tapes 15 and is adapted to be depressed into the dotted line position when the leading edge of the sheet 11, for example, engages the measuring finger 20. In the position shown in the drawing the sheet 12 has just passed the measuring finger 20 and the finger has snapped up from its dotted line position to the full line position under the influence of a spring or gravity or otherwise as desired or suitable. The sheet 13 has passed through rolls 21 and is being delivered along tapes 22 over a driven roll 23 and thence down towards rolls 24. The sheet 14 has passed through rolls 24 and is being carried by tapes 25 towards a delivery chute or plate 26 where it will be delivered to a receiving table 27.

The folding function is performed by a half fold folding means 30 and quarter fold folding means 31 in the example shown. As will be observed from the description below, the folding points may be selected by suitable gearing or drive mechanism in the folding controllers to effect folds at any desired point, for example, at the ⅓ and ⅔ points, or at other points.

The half folding means 30 may be operated by a one revolution clutch 33, for example, and the one-quarter folding means 31 may be operated by one revolution clutch 34. It is to be understood that the folding means or blades can be operated electromagnetically, hydraulically, pneumatically or mechanically without departing from the spirit of this invention. The blades 30 and 31 are suitably pivoted on supports 35 and 36 which may be frame members of the folding machine, for example.

The operation of the folding means 30 and 31 is controlled by four folding controllers or timing mechanisms in the present example. It is to be understood that two or more folding controllers can be utilized within the scope of this invention, but it is preferable, where the sheets 11, 12, 13 and 14 may be of varying length, for example, from over 120 inches down to 25 inches, more or less, that the dimensions of the folder 10 could be such as to accommodate the longest sheet encountered, for example, 10 ft. but there would need be a number of folding controllers to accommodate the shortest pieces to be folded through the machine. Accordingly, if the longest piece were 10 ft. and the shortest piece were 2 ft. it is possible with four timing mechanisms to accommodate the same if the pieces are spaced at least 6 inches apart as they are fed into the folding machine.

Although four units are shown for purposes of illustration, five may be provided in order to assure operation of at least four. To assure proper spacing, the folding machine, when attached to an ironing machine, can be operated at a speed somewhat in excess of the speed of the ironer so that pieces will be spaced somewhat as the folding machine tapes 15 carry the pieces away from the ironer. By way of example, if the ironer is run at 100 ft. a minute, the folding tapes 15 and following tapes may run at a somewhat higher speed, for example 120 ft. per minute and even with a 2 ft. piece this six to five ratio of spacing will be obtained.

As mentioned above, four folding controllers consisting of timing mechanisms 40, 41, 42 and 43 (Fig. 2) have been shown. Inasmuch as all the units are identical in construction only one of them will be described in detail. Also the auxiliary circuit for by-passing a controller will be described after the description of normal operation in which the auxiliary switches are in the position shown. For still further detail of the folding controllers reference may be had to the above mentioned application, Serial No. 312,834.

The blade actuators 33 and 34 are controlled by the folding controllers 40, 41, 42 and 43 in a manner now to be described. The actuators 33 and 34 are both energized from line wire L–1 through a wire 45, wire 46, wires 47 and 48, wires 49 and 50 and wires 51 and 52 to the half speed and quarter speed portions respectively of the folding controller 40. When a contact 53 is engaged by switch arm 54 a circuit is completed from wire L–1 through wires 45, 46, 47, 50, 51, contact 53, blade 54 and wires 55 and 56 to line wire L–2. Accordingly, upon engagement of contact 53 with blade 54 the one revolution clutch on the actuator 33 causes the folding blade 30 to first advance to move the sheet 12 between the rollers 21 and then retire back to the position shown in preparation for receiving another sheet for folding.

The folding blade actuator 34 for making the quarter fold is energized by contact 60 and switch blade 61 when they are in engagement through the following circuit. From line wire L–1 through wires 45, 46, 48, 49, 52, contact 60, blade 61, wire 62 and wire 56 to the line wire L–2. This circuit will cause advance and retiring movement of the folding blade 31 in an identical manner to the operation of the half folding blade 30 as described above.

The engagement of contact 53 with blade 54 controlling the half folding of sheets, and contact 60 and blade 61 controlling the fourth folds is under the influence of driven cams 70 and 71 having detents 72 and 73 respectively which when they pass rollers or the like 74 and 75 attached to switch blades 54 and 61 respectively cause a momentary closure of contact 53 and 54 for the half fold controller 33 and contact 60 and blade 61 for the quarter fold controller 34. The actuators 33 and 34 may be of a type which will self-energize until completing a revolution in a manner well known in the art so that the contacts in the controller 40 above described need be only momentary. The cam 70 is driven by a pair of motors 80 and 81 through suitable overrunning clutch mechanisms 82 and 83 respectively. The motor 80 turns the cam 70 at one-half of the speed that the motor 81 turns the same. Only one of these motors is energized at a time and accordingly, the overrunning clutches 82 and 83 permit the other motor to stand idle while the one is driving the cam 70. As will appear later, the half speed motor 80 drives the cam 70 from the position shown when the measuring finger or sensing means 20 in the folding machine 10 is depressed into the dotted line position. After the measuring finger 20 snaps up to the full line position shown the full speed motor 81 will be energized through wiring and controls to be described hereinafter.

The cam 71 for controlling the quarter fold control device 34 is driven by a ¼ speed motor 90 and a full speed motor 91 through overruning clutch mechanisms 92 and 93 which may be identical to those mentioned above in connection with the drive for the cam 70. When the measuring finger 20 of the folding machine 10 is depressed to the dotted line position the quarter speed motor 90 is energized simultaneously with the one-half speed motor 80. When the measuring finger 20 snaps back to the full line position shown the full speed motor 91 is energized together with the full speed motor 81 for the half fold control. Thus, cams 70 and 71 with their associated switches constitute sub-timing devices which selectively control the operation of folding means 30 and 31. For the position of the several parts in the drawing the sheet 12 has just been measured and the folding control 43 will be in operation for controlling the blade operators 33 and 34. A sequence controller 100 will have just moved its parts from the dotted line positions to the full line positions whereupon the controller 43 will have gone from fractional speed operation of its several cams to full speed operation. Such actuation will have placed folding controller 40 in position for measuring the sheet 11 which is shown as approaching the measuring finger 20.

The sequence controller 100 comprises a series of cams 101, 102, 103, 104, mounted on a shaft 105 and notched around by eight turns by a ratchet 106 which is moved by a pawl 107 operated by an armature 108 under the influence of a solenoid 109, the armature and solenoid 109 forming motor means. A keeper 110 may be spring biased into the position shown to prevent back rotation of the ratchet 106. For each operation the pawl 107 will engage the next succeeding tooth of the ratchet 106 so that when the armature 108 is drawn upward the ratchet 106 will move one-eighth of a 360 degree turn. It is to be noted that the cams 101, 102, 103 and 104 each have two detents spaced 180 degrees apart and the different cams are so positioned so that for each ⅛ revolution of the shaft 105 a detent will register with only one of the followers 111, 112, 113, and 114 of switch blades or switch actuators 115, 116, 117, and 118 respectively. Each switch blade cooperates with in-and-out contacts to form sequence switches and to set up circuits to be described hereinafter, only one of which will be described in detail inasmuch as they are all identical. It is to be noted that in actual practice enclosed snap action switches are preferred. However, for clarity, exposed slow action switches have been shown throughout.

When the leading edge of the sheet 11 engages the measuring finger 20, it will be depressed into the dotted line position and contact 120 will be closed. This will cause the solenoid 109 to be deenergized and permit the relay parts to drop into the dotted line positions. Such closure will complete a circuit for the half and quarter speed motors 80 and 90 respectively as follows: From line wire L–1 through the measuring finger 20, contact 120, wires 121, 122, 123 and 124 to the half speed motor, and 125 to the quarter speed motor; through wires 126 and 127 from the half and quarter speed motors respectively to a wire 128, through wire 129, contact 130, blade 115, wire 131, wire 132 and wire 133 to the other line wire L–2. Such a circuit will cause the half speed motor 80 and the quarter speed motor 90 to turn their respective cams 70 and 71 in a clockwise direction as long as the contact 120 is engaged by the measuring finger 20. Inasmuch as the sheet 11 will hold the measuring finger 20 in the dotted line position as long as it is over same, when it snaps up due to passage of the sheet 11 (as sheet 12 has previously passed), the measuring finger 20 will return to the full line position after the trailing edge of the sheet 11 has passed and thus will give an exact measure of the length of the sheet.

When the measuring finger 20 returns to the full line position, a contact 140 will be engaged by the measuring finger 20 and a circuit for the solenoid 109, and related circuits, will be set up for causing the cams 70 and 71 of the timing mechanism 40 to operate at full speed. By full speed is meant a speed that is proportional to the speed of travel of the sheets 11, 12, 13, etc. through the folding machine so that the folding blades 30 and 31 will be operated at proper time to cause folds into halves and quarters as pointed out above.

With the measuring finger 20 in the position shown after having measured a sheet the circuits will be as follows: From line wire L-1 through measuring finger 20, contact 140, wire 141, solenoid 109, wire 142 and wire 133 to line wire L-2. This will cause the armature 108 to be attracted instantly by the solenoid 109 out of the dotted line position into the full line position shown and thus notch around the ratchet 106 one-eighth of a turn. Such notching around will rotate the shaft 105 and the upper detent of the cam 101 will move 45 degrees in a clockwise direction which will move the switch blade 115 into engagement with an upper contact 145. From this point it is easier to trace the circuit from line wire L-2 up to line wire L-1. A circuit through contact 145 will be completed to the full speed motors 81 and 91 of the controller 40 as follows: From line wire L-2 through wires 133, 132, 131, switch blade 115, contact 145, wires 146, 147 and 148 to motor 81 and wire 149 to motor 91 through wire 150, contact 151, running switch blade 152, wire 153 from the half speed timing portion of the controller 40; through wire 155, contact 156, switch blade 157 of a running switch of the quarter speed sub-timing device and a wire 158 which joins wire 153 from the half speed timing portion of same. The wires 153 and 158 connect through wires 160, 161 and 45 back to line wire L-1 which completes the running circuits to the full speed motors 81 and 91 of the folding controller 40.

It is to be noted that contact 151 was engaged by running switch blade 152 which occurs immediately when the cam 70 is rotated in a clockwise direction. Hence once started and with the contact 145 in engagement with the blade 115 in the sequence controller 100, the cam 70 will make one complete revolution and shut itself off through the action of this running switch. During this revolution the detent 72 will register with the follower 74 or the switch blade 54 controlling the half fold controller 33 in a manner described above.

It is also to be noted that in the quarter speed controller the running switch blade 157 engaged the contact 156 which likewise occurs immediately the cam 71 is rotated from the position shown, which is in a clockwise direction in this diagrammatic arrangement. When the detent 73 registers with the cam follower 75 the quarter fold controller 34 will be operated in the manner described above.

The cam 102 would be placed into operative position similar to the present position of cam 101 when the ratchet 106 is rotated 45 degrees. Hence the piece to be folded following the piece 11 would be controlled by the cam 102 which controls identical circuits through folding controller 41. Likewise on subsequent movements of 45 degrees, each of the cams 103 and 104 would cause operation of folder controls 42 and 43 respectively. Thereafter, the program would begin with the cam 101 in control which would set up folding controller 40 for operation in the maner above described.

*Alternate control*

In the event that one of the above described timing mechanisms 40, 41, 42 and 43 were to fail in its function due to burning out of one of the motors, or failure of the clutch and drive mechanisms, etc., it would fail to perform its proper function in the given sequence. Such failure would cause sheets to come through the folding machine either unfolded or improperly folded. In machines presently available it is necessary to shut down the entire folding device and either replace all of the units with a spare panel or remain shut down until the defective unit can be replaced or repaired. Inasmuch as the ordinary folding machine in a commercial laundry serves a large number of washing machines the shut down can be quite inconvenient due to the piling up of unprocessed sheets ahead of the ironing machine. Accordingly, I provide with my present invention a sequence modifying means for enabling the properly operating units to remain in operation while repair or replacement of the defective part can be effected. In the instance to be described the replacement will be of the unit 40 which will be presumed to have failed and such replacement would require an operator to have on hand only a nominal priced spare part comprising the unit 40 rather than a panel which might include units 40, 41, 42 and 43. It has further been found that the sequence controller 100 described above is not susceptible to break down due to its rugged nature whereas the timing mechanisms themselves made up of many intricate parts are more likely to fail.

The sequence modifying means for cutting out the controls 40, 41, 42 and 43 is identical for all the units and hence only the one associated with unit 40 will be described in detail. During the normal operation described above, the modifying switches 175, 176 and 177 were in their upper or first positions in contact with contacts 178 and 179 with contact 180 in its open position. This completed the normal control circuit for causing the control 40 to perform its proper operating function. With the switch arms 175, 176 and 177 in their lower dotted line positions they will engage respectively contact 181, 180 and open contact 179. This switch action may be accomplished by selector means comprising a push-pull button 182 and a connecting member 183 so that all members are operated together by the push-pull movement. With the contacts 175, 176 and 177 in this dotted line position a control circuit is established which by-passes the timer unit 40. Accordingly, when the measuring finger 20 is depressed to the dotted line position to cause the contact 120 to be engaged the following sequence of events takes place.

When the contact 140 is broken the circuit from line L-1 to the relay coil 109 through wires 141, 142 and 133 to line wire L-2 is broken as described above and the armature 108 drops to its lowermost position. Also as described above, engagement of contact 120 would normally start motors 80 and 90 of the measuring unit 40 in operation. As also pointed out above such operation was controlled by a given sequence switch 115 in combination with contact 130 and 145. However, with the modifying switches 175, 176, 177 in the lower or second position an auxiliary circuit is established for the relay coil 109 as follows: From wire 121 through wire 190, switch blade 191, contacts 192 and 193, switch blade 194, wire 195, wire 196, contact 180, switch blade 176, wire 128, wire 129, contact 130, cam follower switch balde 115, switch blade 175, contact 181, wire 200, wire 201, wire 141, relay coil 109, wire 142 and wire 133 to line wire L-2. Such circuit will cause immediate reenergization of coil 109 and thus pull the armature upward to rotate the ratchet wheel 45 degrees again in a clockwise direction which will cause similar rotation of cams 101, 102, 103 and 104 so that cam 101 will move from the position shown to a position similar to the position now shown for cam 104 which will raise the given follower 115 into engagement with contact 145 and break the circuit through contact 130.

The movement described above will move the cam 102 into a position similar to that shown for 101 in Fig. 1 and accordingly, the cam follower 116 will move downward to cause engagement of contact 130a. Such contact will cause immediate operation of timer unit 41 instead of operation of timer unit 40 which would occur in normal operation. Accordingly, the timer 41 will be acted upon almost instantaneously (except for relay time lag) to take over in a normal manner the function of the measuring unit 40 which developed an abnormality in its function and the succeeding sequentially operated timing unit 41 and 43 continue to perform and function in the same manner as they have hitherto.

In order to insure complete travel and operation of the armature 108 in relation to coil 109 another modifying switch is provided associated with blades 191 and 194 to insure substantial travel of the armature 108 in the upward direction before the contacts 192 and 193 are separated. This device may comprise a permanent magnet 205 connected to the switch blade 191 and a magnetic iron armature 206 connected with the switch blade 194. When blade 191 is forced downward from its normal position shown by an extension 207 of the armature 108 to such position that contacts 192 and 193 are engaged, the magnetic forces between magnet 205 and armature 206 will cause the stronger spring blade 191 to draw the weaker spring blade 194 upwardly with it when the armature 108 moves upward. Such upward travel may be arrested and the contacts broken by the engagement of switch blade 194 with stop 210.

After breaking the contacts, spring blade 194 will be urged downwardly to the position shown and damping can be provided by a ring 211 mounted loosely on pin 212 and biased to the position shown by a light spring 213. Such will cause energy to be dissipated when the spring blade 194 rotates the ring 211 around the pin 212.

Timing mechanisms 41, 42 and 43 may be short-cycled or by-passed by operation of selector means 182a, 182b or 182c, respectively, in the same manner as described in connection with timing unit 40. It is possible with the improved system to provide an extra timing mechanism as a spare part of the equipment to be provided with a folding machine so that adequate and complete operation will be obtained if all but one of the units is operating properly. With such an arrangement, the defective unit may be repaired or replaced within a reasonable time but without necessitating sometimes expensive emergency repairs because of failure of a part. Accordingly, it is apparent that this device increases the utility of a machine and reduces the expense of operating same.

While there has been shown and described in some detail one specific embodiment of the invention it should be apparent that changes may be made in details thereof without departing from the spirit of the invention except as defined in the appended claims.

What is claimed is:

1. A control system for article folding apparatus comprising article folding means; a plurality of timing mechanisms having means connected to said folding means and each operable to selectively control the operation of said folding means; sensing means adapted to initiate operation of each of said mechanisms and responsive to the lengths of the articles being folded and connectable to each of said timing mechanisms for controlling the same; a sequence controller connected to said sensing means and actuated thereby operable to sequentially transfer control to each of said timing mechanisms in sequence for successively fed articles such that each of the timing mechanisms controls the operation of said folding means for each of a sequence of articles being folded; and sequence modifying means operable in a first position to permit said sequential transfer of control by said sensing means to each of said timing mechanisms in sequence and operable in a second position to prevent said sequential transfer of control by said sensing means to at least one of said timing mechanisms while permitting said sequential transfer of control by said sensing means to each of the remaining timing mechanisms.

2. A control system for article folding apparatus comprising article folding means; a plurality of timing mechanisms having means connected to said folding means and each operable to selectively control the operation of said folding means; sensing means adapted to initiate operation of each of said mechanisms and responsive to the lengths of the articles being folded and connectable to each of said timing mechanisms for controlling the same; a sequence controller connected to said sensing means and actuated thereby operable to sequentially transfer control to each of said timing mechanisms in sequence for successively fed articles such that each of the timing mechanisms controls the operation of said folding means for each of a sequence of articles being folded; sequence modifying means electrically connected to each of said timing mechanisms and to said sequence controller, said modifying means being operable in a first position to permit said sequential transfer of control by said sensing means to each of said timing mechanisms in sequence and being operable in a second position to prevent said sequential transfer of control by said sensing means to at least one of said timing mechanisms while permitting said sequential transfer of control by said sensing means to each of the remaining timing mechanisms; and selector means operable to place said modifying means in said first or second positions.

3. A control system for article folding apparatus comprising article folding means; a plurality of timing mechanisms having means connected to said folding means and each operable to selectively control the operation of said folding means and being of the type having one sub-timing device included therein for each of the folding means controlled, said sub-timing devices having first and second rates of operation; sensing means adapted to initiate operation of each of said mechanisms and responsive to the lengths of the articles being folded and connectable to said timing means and actuated thereby to control the rates of operation of the sub-timing devices in each of said timing mechanisms in sequence; a sequence controller connected to said sensing means and actuated thereby, said sequence controller being operable to sequentially transfer control by said sensing means to each of said timing mechanisms for successively fed articles such that each of the timing mechanisms controls the operation of said folding means for each of a sequence of articles being folded; sequence modifying means electrically connected to each of said timing mechanisms and to said sequence controller, said modifying means being operable in a first position to permit said sequential transfer of control by said sensing means to each of said timing mechanisms in sequence and being operable in a second position to prevent said sequential transfer of control by said sensing means to at least one of said timing mechanisms while permitting said sequential transfer of control by said sensing means to each of the remaining timing mechanisms; and selector means operable to place said modifying means in said first or second positions.

4. A control system for article folding apparatus comprising article folding means; a plurality of timing mechanisms having means connected to said folding means and each operable to selectively control the operation of said folding means and being of the type having one sub-timing device included therein for each of the folding means controlled, said sub-timing devices having first and second rates of operation; sensing means adapted to initiate operation of each of said mechanisms and responsive to the lengths of the articles being folded and connectable to said timing means to control the rates of operation of the sub-timing devices in each of said timing mechanisms in sequence; a sequence controller connected to said sensing means and actuated thereby, said sequence control being of the type having one sequence switch having first and second positions included therein for each of said timing mechanisms and motor means sequentially operable to cause one of said sequence switches to assume its first position and the remainder of the switches to assume their second positions; each of said sequence switches being operable in its first position to permit said sensing means to produce said first rate of operation in the sub-timing devices of the timing mechanism associated therewith and being operable in its second position to permit said sensing means to produce said second rate of operation in the sub-timing devices of said associated timing mechanism; sequence modifying means electrically connected to each of said timing mechanisms and the sequence switches and motor means of the sequence controller, said modifying means including modifying switches operable in a first position to permit sequential transfer of control by said sensing means to each of said timing mechanisms in sequence and operable in a second position to prevent said sensing means from producing the first or second rates of operation of the sub-timing devices in at least one of said timing mechanisms while permitting said sequential transfer of control by said sensing means to each of the remaining timing mechanisms; and selector means operable to place said modifying switches in their first or second positions.

5. A control system for article folding apparatus comprising article folding means; a plurality of timing mechanisms having means connected to said folding means and each operable to selectively control the operation of said folding means and being of the type having one sub-timing device included therein for each of the folding means controlled, said sub-timing devices having first and second rates of operation; sensing means adapted to initiate operation of each of said mechanisms and responsive to the lengths of the articles being folded and connectable to said timing means to control the rates of operation of the sub-timing devices in each of said timing mechanisms in sequence; a sequence controller connected to said sensing means and actuated thereby, said sequence control being of the type having one sequence switch having first and second positions included therein for each of said timing mechanisms and motor means sequentially operable to cause one of said sequence switches to assume its first position and the remainder of the switches to assume their second positions, each of said sequence switches being operable in its first position to permit said sensing means to produce said first rate of operation in the sub-timing devices of the timing mechanism associated therewith and being operable in its second position to permit said sensing means to produce said second rate of operation in the sub-timing devices of the associated timing mechanism; first modifying switch means operable to first or second positions in response to movement of said motor means and electrically connected to said sensing means; second modifying switch means operable to first or second positions and electrically connected to said first modifying switch means and said sequence switches; third modifying switch means operable to first or second positions and electrically connected to said sequence switches and said motor means; fourth modifying switch means operable to first or second positions and electrically connected to said sequence switches and the sub-timing devices of said timing mechanisms; and selector means operable to place said second, third and fourth modifying switch means in their first or second positions, said second, third and fourth modifying switch means being jointly operable when in their first positions to permit sequential transfer of control by said sequence controller of said sensing means to each of said timing mechanisms for successively fed articles and being jointly operable when in their second positions with said first modifying switch means to prevent sequential transfer of control by said sequence controller of said sensing means to at least one of said timing mechanisms while permitting said sequential transfer of control of the sensing means to each of the remaining timing mechanisms.

References Cited in the file of this patent

UNITED STATES PATENTS

| | | |
|---|---|---|
| 1,519,733 | Kohn | Dec. 16, 1924 |
| 2,605,780 | Nance | Aug. 5, 1952 |
| 2,643,879 | Spreckelmeier | June 30, 1953 |
| 2,652,246 | Kagan | Sept. 15, 1953 |